Feb. 25, 1958  M. E. FRY  2,824,941
DOMESTIC APPLIANCE
Filed July 18, 1955  2 Sheets-Sheet 1

INVENTOR.
Millard E. Fry
BY R R Candor
His Attorney

Feb. 25, 1958    M. E. FRY    2,824,941
DOMESTIC APPLIANCE
Filed July 18, 1955    2 Sheets-Sheet 2

| CONTROL POSITIONS | SWITCH CLOSED | EFFECTIVE WATTS | | "OFF" |
|---|---|---|---|---|
| | | PREHEAT | CYCLING | |
| WARM & LO BOIL 1-2-3-4 | 141-143 86-88 61-173 | 1400 | 260 | 80 |
| HI BOIL & FRY 5-6-7 | 141-143 86-88 61-135 | 2050 | 1060 | 80 |
| TOP FRY 8-9-10 | 141-143 86-88 61-135 163-165 | 2050 | 2050 | 60 |

INVENTOR.
Millard E. Fry
BY R R Candor
His Attorney

United States Patent Office 2,824,941
Patented Feb. 25, 1958

2,824,941

DOMESTIC APPLIANCE

Millard E. Fry, Dayton, Ohio, assignor to General Motors Corporation, Detroit, Mich., a corporation of Delaware Application July 18, 1955, Serial No. 522,478

9 Claims. (Cl. 219—20)

This invention relates to a domestic appliance and more particularly to an improved temperature control of electric range surface heaters having quick pre-heating.

It is an object of this invention to provide a simple temperature control for surface heaters in which the contacts most critical in keeping the calibration are amply protected against deterioration.

It is another object of this invention to provide a simplified temperature control for surface heaters in which the contacts cycled most frequently and primarily relied upon to control the temperatures are shunted by a resistance to minimze deterioration changes in calibration.

These and other objects are attained in the form shown in the drawings in which a two-section surface heater is controlled by an adjustable two-step thermostat. In the highest temperature setting, deterioration of the first step contacts of the thermostat is prevented since they are shunted out and the unit cycles on the second step contacts. The second step contacts are always protected from deterioration by being shunted by a small heater which controls a set of intermittently opening and closing contacts to allow a small current flow and a small amount of heating during the off cycles. In the medium temperature settings, the first step thermostat disconnects one section of the surface heater when the selected preheat temperature is reached and the temperature is thereafter regulated by cycling the remainder of the surface heater upon the second step contacts which are protected by the small shunt heater. In the low temperature positions the first step contacts disconnect one section of the heater when the selected preheat temperature is reached. The remaining section of the heater has its heat reduced throughout the closed periods of the second step switch by an intermittently opening and closing pulsing switch energized by a portion of the shunting heater of the second step contacts. The opening of the second step contacts further reduce the heat energy.

Further objects and advantages of the present invention will be apparent from the following description, reference being had to the accompanying drawings, wherein a preferred form of the present invention is clearly shown.

Figure 1:
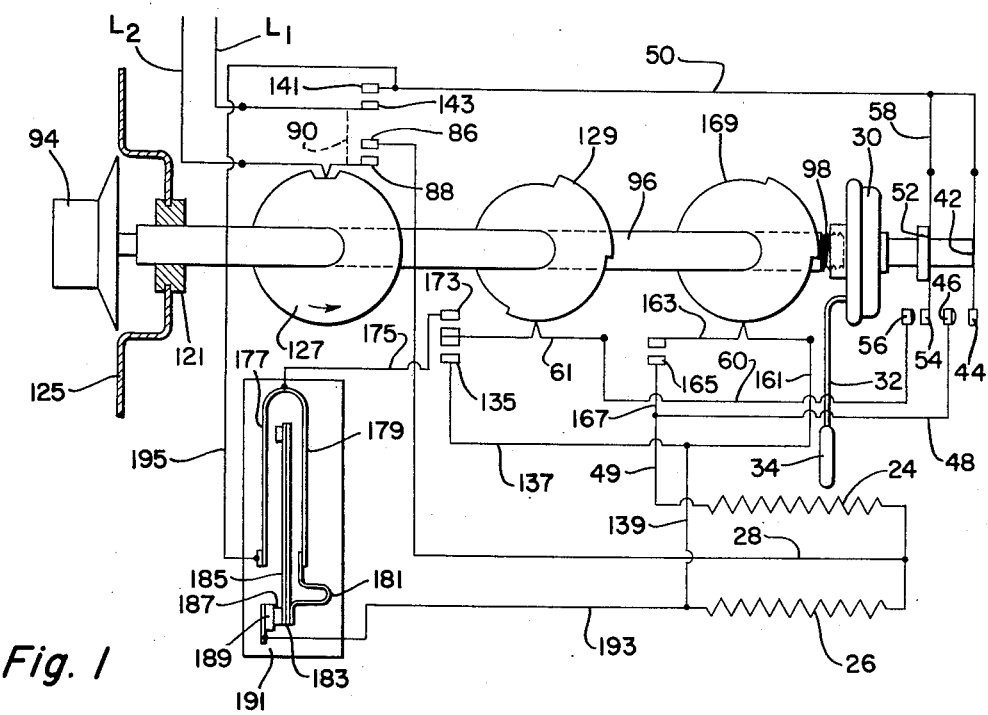
Figure 1 is a diagrammatic view and wiring diagram of one form of my invention.
Figure 2:
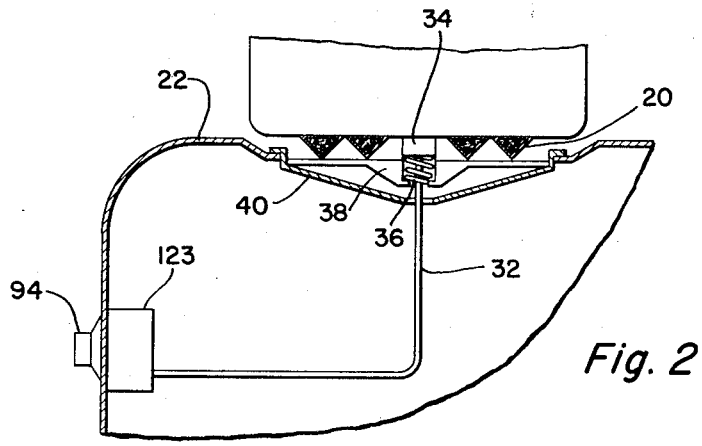
Figure 2 is a vertical sectional view through an electric range and surface heater embodying my invention.
Figure 3:
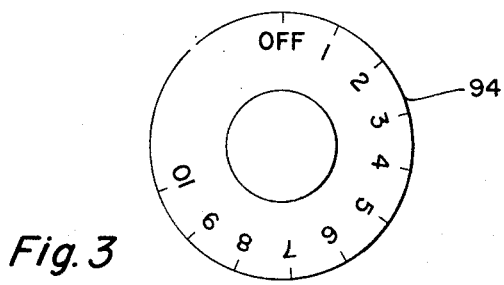
Figure 3 is a front view of the dial knob shown in Figure 2.
Figures 4, 5:
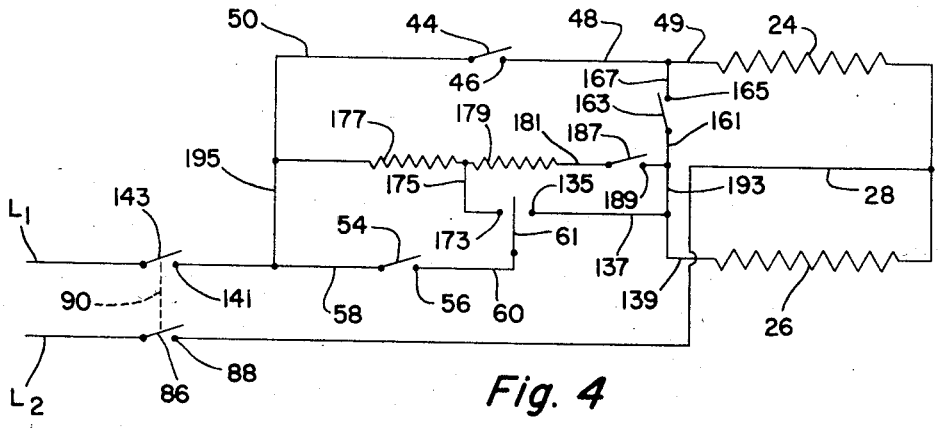
Figure 4 is a simplified wiring diagram of the system shown in Figure 1.
Figure 5 is a chart showing the relationship between the control positions of the knob with the switches manually closed and the wattage input.

Referring now to the drawings and more particularly to Figures 1 and 2 there is shown a two-section three terminal surface heater 20 for the top 22 of an electric range. This surface heater may be of the tubular sheath type wound in the form of a spiral and containing two heater sections extending in parallel with a third conductor within the sheath which is triangular in cross-section. The heater may be of the type shown in the Tuttle Patent No. 2,508,552 issued May 30, 1950. The two sections 24 and 26 each have one end connected to a common junction connecting with the conductor 28. The conductor 28 connects the junction of the two surface heaters 24 and 26 to a stationary contact 86 a movable contact 88 co-operates with the contact 86 and connects to the second supply conductor $L_2$. The sections may have the same or different values of resistance. In the particular example herein illustrated the heater sections 24 and 26 each have a resistance of 54.3 ohms.

The primary temperature control of this surface heater 20 is provided by a two-step thermostat which includes a hydraulic system having a hydraulically operable diaphragm 30 connected by a capillary tube 32 to a spring-mounted thermostat bulb 34 mounted in the center of the heater 20 as shown in Figure 2. The thermostat bulb 34 is spring pressed upwardly by the spring 36 and supported by the heater support 38. The heater support 38 is supported by the drip pan 40 through which extends the capillary tube 32.

The diaphragm 30 is provided with a follower 42 which is adapted at the selected temperature to open a movable switch contact 44 away from a co-operating stationary contact 46. This stationary contact 46 is connected by the conductors 48 and 49 to the second or free end of the heater section 24. The movable contact 44 is connected by the conductor 50 to the stationary contact 141 co-operating with a movable contact 143 forming a supply connection which connects to the supply conductor $L_1$. The diaphragm 30 is provided with a second follower 52 adapted to engage a second movable switch 54 at a constant increment above the temperature at which the movable switch contact 44 is opened such as 25° F. This movable switch contact 54 co-operates with the stationary switch contact 56. The movable switch contact 54 is connected by the conductor 58 to the conductor 50 and the supply connection 141, 143.

The diaphragm 30 is moved axially to the left to raise the temperature setting while it is moved axially to the right to lower the temperature setting. This is accomplished by providing a threaded connection 98 with the end of a cam shaft 96. The front end of the cam shaft 96 is provided with a bearing 121 in the front wall of the control housing 123. The front end of the cam shaft 96 is provided with a dial knob 94 having temperature indications extending from off to 10 indicated thereon.

The stationary switch contact 56 is connected by the conductor 60 to a double throw switch member 61 operated by a cam 129. In positions 5 to 10 of the knob 94 the cam 129 has a raised portion moving the switch 61 downwardly into contact with a stationary contact 135. This stationary contact is connected by the conductors 137 and 139 to the second or free terminal of the heater section 26.

In positions 8 to 10 of the knob 94, this second terminal of the heater section 26 is connected by the conductors 139 and 161, the movable switch member 163, a stationary contact 165 and the conductor 167 to the conductor 48 so that the first step switch members 44 and 46 are effectively shunted. The movable switch member 163 is moved to a closed position in positions 8 to 10 by the cam 169 mounted upon the cam shaft 96. In all other positions of the knob 94 the switch member 163 is in the open position.

In positions 1 to 4 of the knob 94, the cam 129 moves the movable switch member 61 into contact with the stationary contact 173. This stationary contact 173 is connected by the conductor 175 to the mid-point of a two-section wire heater including a first section 177 and a second section 179. The sections 177 and 179 may have resistances of .232 and .148 ohm respectively. The opposite end of the section 179 is connected by a flexible conductor 181 to the movable end 183 of a cantilever bi-metal 185 which is located between the heater section 177 and 179 so that it will receive heat from both sections. The free end of the bi-metal 185 is provided with a contact 187 adapted to make contact with a stationary contact 189 when it is cooled. The parts 177 to 189 are mounted upon a base 191 of electrical insulating material and constitute a pulsing electro thermal relay which is calibrated to be closed between 25 and 31% of the time when the contact 61 engages contact 173. The stationary contact 189 is connected by the conductor 193 to the second or free terminal of the heater section 26.

With this arrangement in positions 1 to 4 when contact 61 engages contact 173, the heater section 26 will be energized on an average of 25 to 31% of its capacity as long as the second step switch contacts 54 and 56 are closed. When the contacts 54 and 56 are open, a small amount of heat is provided through the conductor 195 which connects the second terminal of the wire heater section 177 with the conductor 50. This connects the heater sections 177 and 179 in series with the pulsing switch contacts 187, 189. The application of the heat from both sections 177 and 179 to the bimetal 185 causes the contacts 187, 189 to be open more than 97% of the time. By this arrangement, when the contacts are open, the heat is limited to less than 3% of the capacity of the heater 26.

Therefore, this wire heater section 177 is connected in shunt across the second step switch contacts 54 and 56 so as to protect these contacts during cycling at all times from deterioration. It is well known that arcing and deterioration are minimized when contacts are shunted in this manner. In positions 1 to 7 practically all of the cycling is upon the second step contacts 54 and 56 which are protected by the shunt heater 57 at all times. Usually the pre-heat or first step contacts only open once during most cooking operations while in positions 1 to 7 the second step contacts may cycle five to ten times. In positions 8 to 10 the first step contacts are shunted out by the closing of switches 61 and 135 and 163 and 165 so that they are prevented from arcing and deterioration in these positions 8 to 10 by being effectively shunted out of control.

The knob positions are arranged and coordinated with the thermostat adjustment so that boiling can be accomplished in both positions 4 and 5 so that two heating rates at boiling temperatures are available. A low pre-heat and very low cycling heat is provided in positions 1 to 4. In positions 5 to 7 the maximum pre-heat is provided and the greatest heat during cycling is one-half the maximum obtainable in preheat. In positions 8 to 10 the maximum heat is available at all times for quick recovery in the event the temperature drops. The movable switch contacts 88 and 143 are connected by a common mechanical connection 90 and are operated to the closed position in all knob positions except off by the cam 127 which is fixed to the knob shaft 96. The switches 86, 88, 141 and 143 provide a supply connection which de-energizes the entire system when the knob 94 is turned to the off position.

While the form of embodiment of the invention as herein disclosed constitutes a preferred form, it is to be understood that other forms might be adopted, as may come within the scope of the claims which follow.

What is claimed is as follows:

1. An electrical heating system for heating receptacles on the top of a support including supply connections, an electric surface heating means having connected sections and three terminals, an adjustable two step thermostat substantially responsive to the temperature of any receptacle upon the surface heating means, said thermostat having successively operating first and second step switches connected to one of said supply connections, conductors connecting said first step switch to one of said terminals, a conductor connecting a second terminal of said heating means to a second supply connection, an intermittently opening and closing switch having one terminal connected to a third terminal of said heating means and having second and third terminals providing different proportions of closed time, conductor and selective switch means electrically connecting said second step switch selectively to the second terminal of said intermittent switch and to a third terminal of said heating means, and a conductor connecting the third terminal of said intermittent switch and said one supply connection.

2. An electrical heating system for heating receptacles on the top of a support including supply connections, an electric surface heating means having connected sections and three terminals, an adjustable two step thermostat substantially responsive to the temperature of any receptacle upon the surface heating means, said thermostat having successively operating first and second step switches connected to one of said supply connections, conductors connecting said first step switch to one of said terminals, a conductor connecting a second terminal of said heating means to a second supply connection, an intermittently opening and closing switch having one terminal connected to a third terminal of said heating means and having second and third terminals providing different proportions of closed time, conductor and selective switch means electrically connecting said second step switch selectively to the second terminal of said intermittent switch and to a third terminal of said heating means, and a conductor connecting the third terminal of said intermittent switch and said one supply connection, said thermostat having adjustment means, said adjustment means having means for operating said selective switch means.

3. An electrical heating system for heating receptacles on the top of a support including supply connections, an electric surface heating means having connected sections and three terminals, an adjustable two step thermostat substantially responsive to the temperature of any receptacle upon the surface heating means, said thermostat having successively operating first and second step switches connected to one of said supply connections, conductors connecting said first step switch to one of said terminals, a conductor connecting a second terminal of said heating means to a second supply connection, an intermittently opening and closing switch having one terminal connected to a third terminal of said heating means and having second and third terminals providing different proportions of closed time, conductor and selective switch means electrically connecting said second step switch selectively to the second terminal of said intermittent switch and to a third terminal of said heating means, and a conductor connecting the third terminal of said intermittent switch and said one supply connection, and an additional switch connecting said second step switch and said one terminal of said heating means.

4. An electrical heating system for heating receptacles on the top of a support including supply connections, an electric surface heating means having connected sections and three terminals, an adjustable two step thermostat substantially responsive to the temperature of any receptacle upon the surface heating means, said thermostat having successively operating first and second step switches connected to one of said supply connections, conductors connecting said first step switch to one of said terminals, a conductor connecting a second terminal of said heating means to a second supply connection, an intermittently opening and closing switch having heat operated contacts and electric heater sections connected in series with said contacts, a conductor connecting said contacts and the third terminal of said heating means, a conductor connecting said heater section and said one supply connection, and a selector switch connected to said second step switch and having one selective connection connected to the junction of said heater sections and having a second selective connection connected to the third terminal of said heating means.

5. An electrical heating system for heating receptacles on the top of a support including supply connections, and electric surface heating means having connected sections and three terminals, an adjustable two step thermostat substantially responsive to the temperature of any receptacle upon the surface heating means, said thermostat having successively operating first and second step switches connected to one of said supply connections, conductors connecting said first step switch to one of said terminals, a conductor connecting a second terminal of said heating means to a second supply connection, an intermittently opening and closing switch having heat operated contacts and electric heater sections connected in series with said contacts, a conductor connecting said contacts and the third terminal of said heating means, a conductor connecting said heater sections and said one supply connection, and a selector switch connected to said second step switch and having one selective connection connected to the junction of said heater sections and having a second selective connection connected to the third terminal of said heating means, and a second selector switch connecting said second step switch and said first terminal of said heating means.

6. An electrical heating system for heating receptacles on the top of a support including supply connections, an electric surface heating means having connected sections and three terminals, an adjustable two step thermostat substantially responsive to the temperature of any receptacle upon the surface heating means, said thermostat having successively operating first and second step switches connected to one of said supply connections, conductors connecting said first step switch to one of said terminals, a conductor connecting a second terminal of said heating means to a second supply connection, an intermittently opening and closing switch having heat operated contacts and electric heater sections connected in series with said contacts, a conductor connecting said contacts and the third terminal of said heating means, a conductor connecting said heater sections and said one supply connection, and a selector switch connected to said second step switch and having one selective connection connected to the junction of said heater sections and having a second selective connection connected to the third terminal of said heating means, and a second selector switch connecting said second step switch and said first terminal of said heating means, said thermostat having adjustment means, said adjustment means having means for operating said first selector switch.

7. An electrical heating system for heating receptacles on the top of a support including supply connections, an electric surface heating means having connected sections and three terminals, an adjustable two step thermostat substantially responsive to the temperature of any receptacle upon the surface heating means, said thermostat having successively operating first and second step switches connected to one of said supply connections, conductors connecting said first step switch to one of said terminals, a conductor connecting a second terminal of said heating means to a second supply connection, an intermittently opening and closing switch having heat operated contacts and electric heater sections connected in series with said contacts, a conductor connecting said contacts and the third terminal of said heating means, a conductor connecting said heater sections and said one supply connection, a selector switch connected to said second step switch and having one selective connection connected to the junction of said heater sections and having a second selective connection connected to the third terminal of said heating means, and a second selector switch connecting said second step switch and said first terminal of said heating means, said thermostat having adjustment means, said adjustment means having means for operating said first and second selector switches.

8. An electrical heating system for heating receptacles on the top of a support including supply connections, an electric surface heating means having connected sections and three terminals, an adjustable two step thermostat substantially responsive to the temperature of any receptacle upon the surface heating means, said thermostat having successively operating first and second step switches connected to one of said supply connections, conductors connecting said first step switch to one of said terminals, a conductor connecting a second terminal of said heating means to a second supply connection, an intermittently opening and closing switch having heat operated contacts and electric heater sections connected in series with said contacts, a conductor connecting said contacts and the third terminal of said heating means, a conductor connecting said heater sections and said one supply connection, and a selector switch connected to said second step switch and having one selective connection connected to the junction of said heater sections and having a second selective connection connected to the third terminal of said heating means, and a second selector switch connecting said second step switch and said first terminal of said heating means, said thermostat having adjustable means, said adjustment means having means for operating said second selector switch.

9. An electrical heating system for heating receptacles on the top of a support including supply connections, an electric surface heating means having connected sections and three terminals, an adjustable two step thermostat substantially responsive to the temperature of any receptacle upon the surface heating means, said thermostat having successively operating first and second step switches connected to one of said supply connections, conductors connecting said first step switch to one of said terminals, a conductor connecting a second terminal of said heating means to a second supply connection, conductors connecting said second step switch and the third terminal, and a heat operated intermittently opening and closing switch having heat operated contacts connected in series with said second step switch and having an electric heater thermally associated with said heat operated contacts electrically connected in shunt with said second step switch.

References Cited in the file of this patent

UNITED STATES PATENTS

| | | |
|---|---|---|
| 2,301,129 | Lehmann | Nov. 3, 1942 |
| 2,388,839 | Fry | Nov. 13, 1945 |
| 2,399,423 | Bletz | Apr. 30, 1946 |
| 2,403,824 | Newell | July 9, 1946 |
| 2,410,013 | Clark | Oct. 29, 1946 |
| 2,606,990 | Akeley | Aug. 12, 1952 |
| 2,675,455 | Richardson | Apr. 13, 1954 |
| 2,767,293 | Jordan | Oct. 16, 1956 |
| 2,790,057 | Schaver | Apr. 23, 1957 |